(12) United States Patent
Kozenkov et al.

(10) Patent No.: US 7,070,913 B2
(45) Date of Patent: Jul. 4, 2006

(54) PHOTO-INDUCED DICHROIC POLARIZERS AND FABRICATION METHODS THEREOF

(75) Inventors: Vladimir Markovich Kozenkov, Kowloon (HK); Wing Chiu Yip, Kowloon (HK); Vladimir Grigorievich Chigrinov, Kowloon (HK); Elena Karlovna Prudnikova, Kowloon (HK); Hoi Sing Kwok, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 0 days.

(21) Appl. No.: 09/853,648

(22) Filed: May 14, 2001

(65) Prior Publication Data

US 2002/0172893 A1    Nov. 21, 2002

(51) Int. Cl.
    *G02B 5/30* (2006.01)

(52) U.S. Cl. ...................... 430/321; 359/491
(58) Field of Classification Search .............. 430/321, 430/7; 359/490, 491, 502; 349/96, 97
See application file for complete search history.

(56) References Cited

U.S. PATENT DOCUMENTS

| 5,024,850 A | * | 6/1991 | Broer et al. ................... 428/1 |
| 5,286,418 A | * | 2/1994 | Nakamura et al. .......... 252/585 |
| 5,340,504 A | * | 8/1994 | Claussen .................... 252/585 |
| 5,739,296 A |   | 4/1998 | Gvon et al. |
| 6,049,428 A |   | 4/2000 | Khan et al. |

FOREIGN PATENT DOCUMENTS

JP         56-036612 A    *    4/1981

* cited by examiner

*Primary Examiner*—John A. McPherson
(74) *Attorney, Agent, or Firm*—Buchanan Ingersoll PC

(57) ABSTRACT

The present invention provides a method of forming a polarizing material comprising exposing a layer of dichroic material to activating light illumination to provide an ordered structure with a distinguished absorption axis and thus photo-induce polarization, and fixing the induced polarization by polymerisation of the dichroic layer. The present invention also provides novel polarizing materials formed thereby. By selectively exposing regions of the dichroic material to differing activating radiation, different regions with different polarization axes can be created. The polarizing material can also be provided with a coating or coatings to alter the spectral response, and a stack formed of a plurality if dichroic layers may be provided.

14 Claims, 8 Drawing Sheets

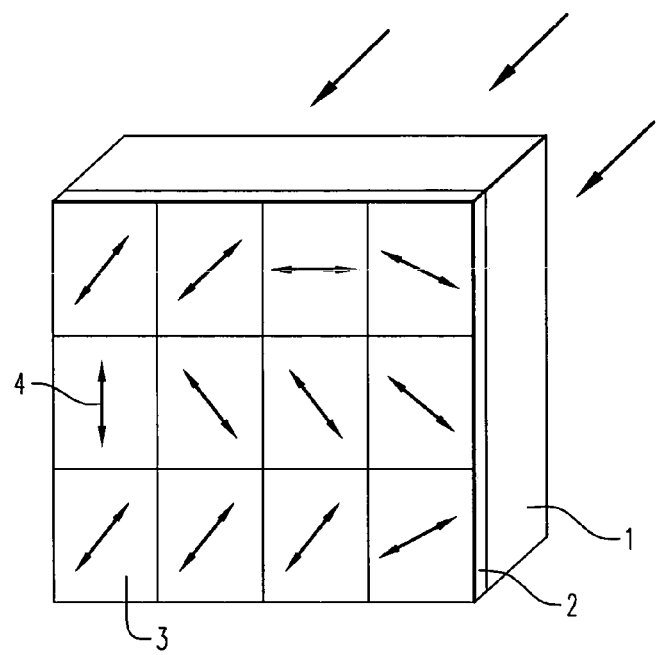
FIG. 5
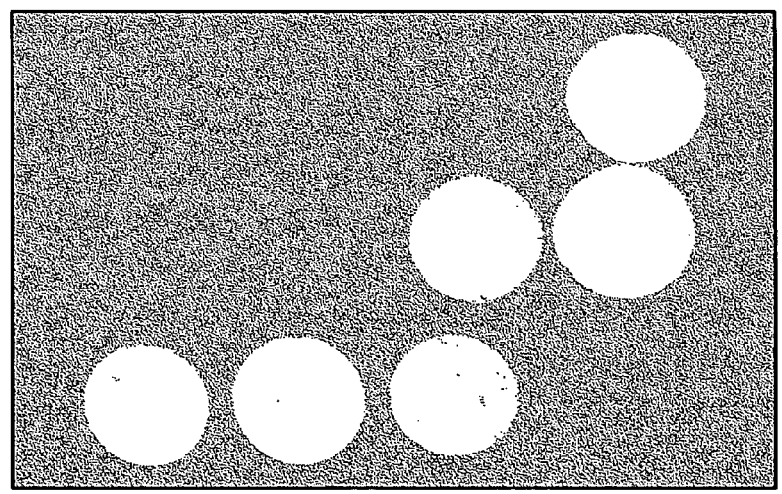

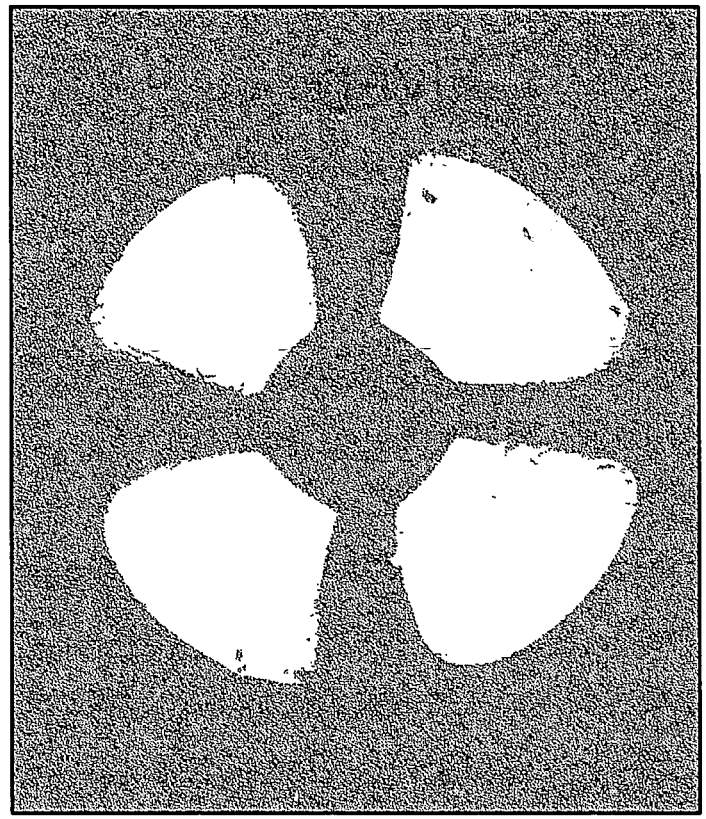
FIG. 6
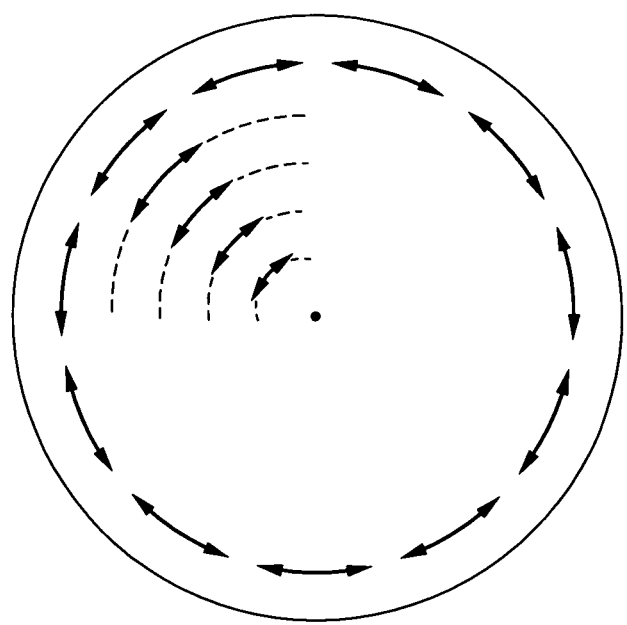

PHOTO-INDUCED DICHROIC POLARIZERS AND FABRICATION METHODS THEREOF

FIELD OF THE INVENTION

This invention relates to methods of fabricating polarizers from dichroic materials, and to polarizers fabricated by such methods. In particular, the invention relates to photochemically stable dichroic molecules and the device structures, which are suitable for the fabrication of thin light polarizers.

PRIOR ART

Light-polarization films or polarizers are major components liquid crystal displays (LCDs) and other liquid crystal (LC) devices. Commercial polarizers are usually based on polyvinyl-alcohol-iodine (PVA) films of 150–400 µm thick. These polarizers are generally placed on the external glass surfaces of the LC cell and require protective films (e.g. cellulose triacetate or cellulose acetate butyrate). The fabrication of such known commercial polarizers is rather complicated and expensive. Recently, to improve the cost-effectiveness, there are have been proposals to fabricate the light polarizers by printing or photo-alignment technologies.

In U.S. Pat. Nos. 5,739,296 and 6,049,428, polarizing films are formed from dyestuffs, which have stable lyotropic liquid crystalline phases in a wide range of concentrations, temperatures and pH-values. In a sheared flow, the lyotropic liquid crystal molecules are self-assembled and oriented preferentially in connection with the flow direction. When the proper preparation conditions are met, a well ordered solid phase of the lyotropic liquid crystal is formed. In certain cases, the order parameter as a measure of this alignment effect is high, so that this material is suitable for the fabrication of polarizers. To create this sheared flow, rollers and blades have been suggested.

To minimize any defects due to the shear flow alignment, a photo-alignment technology to prepare the thin photo-patterned polarizer has been proposed [V. Kozenkov et al, SID'00 DIGEST, p. 1099]. Since this is a non-contact method, the particulates and static charges generated can be in principle eliminated. In addition, the cross contamination problems can be minimized. With a birefringent mask, this technique makes the fabrication of multi-domain structures more cost-effective for the wide viewing-angle LCD applications

SUMMARY OF THE INVENTION

According to the present invention there is provided a method of forming a polarizing material comprising the steps of: (a) forming a layer of a dichroic material on a substrate, and (b) exposing said layer to activating light illumination to provide an ordered structure with a distinguished absorption axis. Preferably the layer may be polymerised.

Preferably different regions of the polarizing material are polarized by activating radiation with different polarization axes so as to produce regions of said polarizing material with differing axes of polarization. This may be achieved by regions of the layer being exposed independently by the use of masks to isolate selected regions for exposure. Alternatively a birefringence mask may be used to create activating radiation with a selected spatial distribution of polarization vectors.

In preferred embodiments the layer may be provided with a coating (eg iodine) to change its spectral response. If different regions of the layer are formed with different coatings a multi-color polarizing material may be produced A stack of layers may be formed on a substrate with the layers being separated by isolation layers.

The activating radiation is polarized or non-polarized, but directed and may be a continuous waveform or may be pulsed. The polarization of the dichroic layer may be controlled by varying parameters selected from the group consisting of the incident angle of the activating radiation, the exposure energy density and the process temperature.

According to the present invention there is also provided a polarizing material comprising a layer of a photochemically stable dichroic absorber. Preferably the absorber is formed within a polymer matrix.

The dichroic absorber may be selected from the group consisting of: mono-, bis-. tris-, and poly-azo dyes, quinone dyes, mono- and poly-oxyanthraquinone dyes, sulfur-substituted hydroxythio-anthraquinone dyes, aminohydroxyanthraquinone dyes, anthrapyrimidinone dyes, merocyane dyes, azomethine dyes, polycyclic compounds, benzoquinones, napthoquinones, tolanes, diphenyls, p-nitroanilines, p-nitrosodialkylanilines, dialkylaminostyroles.

The polymeric materials may be selected from the group consisting of: polyimide, polyethylene, cellulose acetate, polystyrene, polycarbonate, polyester, polyacrylonitrile, polyacetal, polyacrylamide, polybutadiene, polyvinylalcohol, polymethylmethacrylate, and polyvinylcinnamate.

The polarizing material may be provided with a coating of a material (eg iodine) selected to alter the spectral response of said material.

BRIEF DESCRIPTION OF THE DRAWINGS

Some examples of the invention will now be described by way of example and with reference to the accompanying drawings, in which:

FIG. 5 shows an embodiment of the invention with a polarizer having areas of different polarization axes, FIG. 6 shows another embodiment of a multi-axes photo-induced polarizer.

DETAILED DESCRIPTION OF PREFERRED EMBODIMENTS

Before describing a number of embodiments and examples of the present invention, it would be useful to define a number of terms to be used in this specification.

By "anisotropically absorbing molecules", reference is made to compounds with anisotropic geometry, such as rod-shaped or disc-shaped, which exhibit absorption properties with different values along different axes. For example, dichroic compounds and lyotropic liquid crystal compounds are anisotropic absorbers.

By "linear polarized light" is meant light that is polarized mostly along one axis (the major axis) of a plane orthogonal to the propagation direction.

The term "photochemically active molecules" refers to molecules that are involved in irreversible or reversible photochemical reactions. In the solid phase, the quantum efficiency associated with the photochemical reaction is about 0.1–1.

The term "photochemically stable molecules" refers to molecules that are no longer involved in the irreversible or reversible photochemical reaction. In the solid phase, in such cases the quantum efficiency associated with the photochemical reaction is about $10^{-8}$–0.1.

The term "photostable molecules" refers to cases where the quantum efficiency associated with the photochemical reaction is less than $10^{-8}$.

By the term "photo-anisotropic medium" (PAM) is meant that the isotropic solid phases of photochemically active, photochemically stable and photostable molecules exhibit photo-induced anisotropy (absorption dichroism and birefringence), upon the absorption of polarized or non-polarized photons. The induced anisotropy is associated with the direction of polarization vector, the incident angle and exposure energy of the light illumination.

The term "substrates" refers to any medium able to support the formation of thin surface layers of PAM for example, A substrate can be any solid combination of layered materials. The materials can be any combination of glass, silicon, oxides, plastics and metals. In particular, silver, gold, aluminum, polyimide, silicon monoxide, indium-tin-oxide, silicon dioxide, and color filter layers are common examples.

Figure 1A:
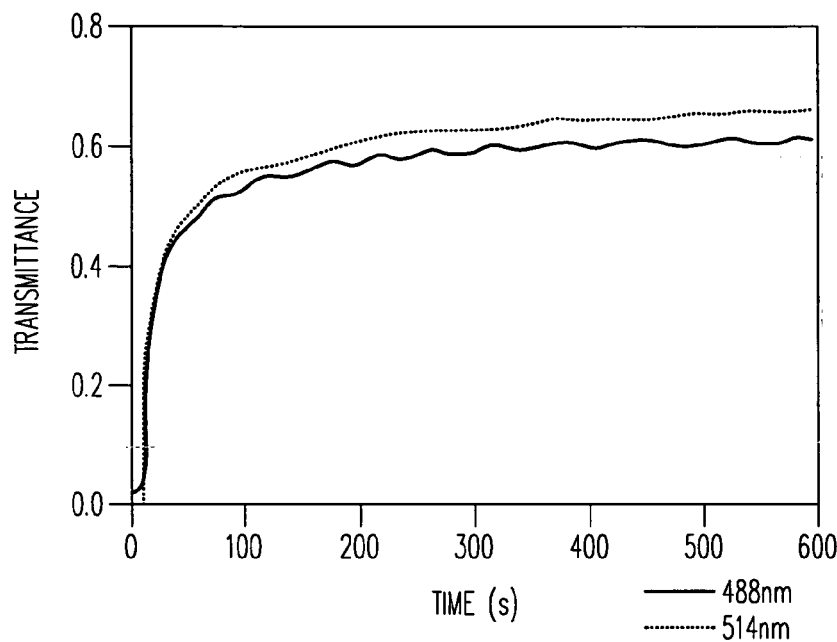
FIG. 1 shows the transmittance of an azodye film during the pumping (a) and the dark relaxation (b), the molecular transformation is pumped by a laser beam of about 100 mW/cm$^2$ at 488 nm or 514 nm, whereas the signal is probed by a 0.2 mW-633 nm laser source.

As will be seen from the following description of preferred embodiments and examples, the present invention provides photo-induced polarizers formed of dichroic materials. In particular, as can be seen from FIG. 1(a), when the dichroic molecules are exposed to a low power actinic radiation, long-lasting optical anisotropy and dichroism are photo-induced.

There are two major types of physical mechanisms, which give rise to the photo-induced phenomena. The first is based on irreversible photo-chemical reactions, such as photo-induced cross-linking and photo-decomposition. The anisotropic layers formed in this way are characterized by a small value of the order parameter (<0.4) and the corresponding low value of the induced optical anisotropy and dichroism. The order parameter is very sensitive to the exposure time and chemical content of the substance and has to be accurately controlled. Moreover the contamination of the initial substance by the by-products of the photo-degradation is possible in certain cases. The dichroic spectra of these substances considerably change its form during the exposure. All these disadvantages prevent the application of the absorbing layers, formed by photo-chemical mechanism as dichroic polarizers.

Figure 1B:
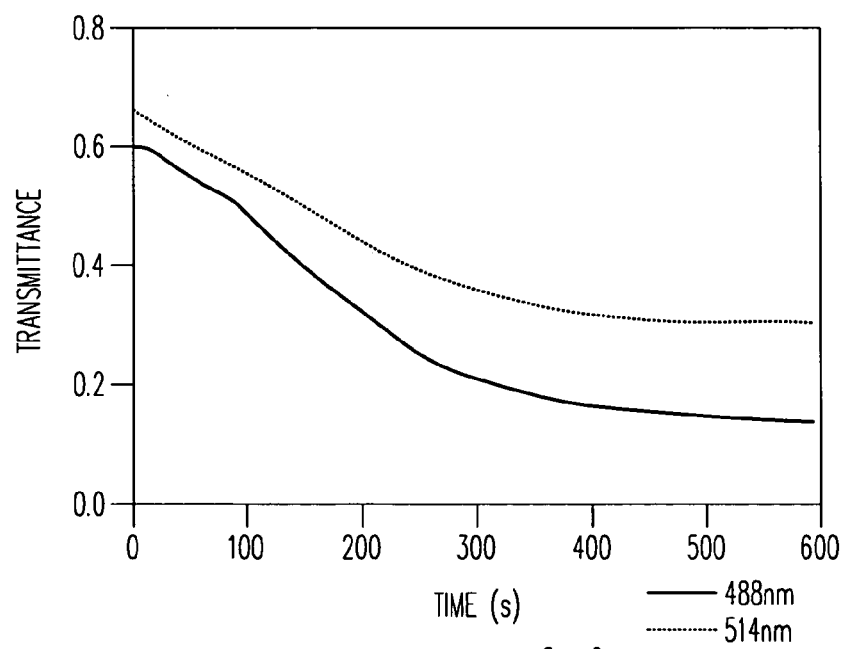

The second mechanism is based on the reversible cis-trans isomerization and Weigert effect, i.e. Brownian motion in a potential field of the actinic light. The probability $\epsilon$ of photo-absorption is proportional to the square of cosine angle between the polarization vector of actinic light $E_{h\nu}$ and the vectorial absorption dipole $\mu_{ge}$, i.e. $\epsilon \sim |\mu_{ge} \cdot E_{h\nu}|^2$. In other words, the molecules that have their transition dipole moments parallel to the direction of the polarized light will probably undergo the conformational molecular changes. Consequently, these will lead to a non-uniform distribution of molecules. However, with this mechanism when the pumping light source is removed, the molecules and domains relax slowly (FIG. 1b). The order parameter as a measure of these photo-induced effects can be very high in some dichroic materials, but since these are reversible processes, blending with a polymer matrix or polymerization to form a network is preferable so as to fix the alignment against any thermal or photo perturbation. Therefore, a polarizer can be produced by this clean and non-contact method. In addition, the fabrication methods for multilayers, -axes and -colour photo-induced polarizers based on the same dichroic materials are described in the following. The polarizers and the polarizer fabrication techniques described in this specification are all compatible with current LCD manufacturing techniques.

The photo-induced optical anisotropy of PAM takes place due to the orientational molecular ordering. The major axis of induced anisotropy is perpendicular to the direction of polarized activating radiation. It will however be parallel to the plane of incidence for the non-polarized actinic radiation. Some of the photochemically stable substances give rise to the high molecular order parameter S>0.8 and are thermally stable up to the melting temperature of the substances. In some cases, the corresponding temperature is 140° C.–180° C. In addition, the spectral changes of those substances are not noticeable.

The PAMs materials can be based on photostable organic compounds and dichroic dyes with an anisotropic absorption either in UV-, visible or IR- spectral region in the range between 200 and 2000 nm and, in particular, in the visible region between 400 and 800 nm.

These substances belong to the following dye groups: mono-, bis-, tri- and poly-azo dyes, metal-complex azo dyes; quinone dyes; mono- and poly-oxyanthraquinone dyes, sulphur-substituted hydroxythio-anthraquinone dyes, aminohydroxy-anthraquinone dyes; anthrapyrimidinone dyes; merocyane dyes; azomethine dyes; polycyclic compounds; benzoquinones and naphthoquinones; tolanes; diphenyls; p-nitroanilines, p-nitrosodialkylanilines; dialkylaminostyroles etc. Besides, these substances can have bi-functional reactive groups, which polymerize by thermal or photo treatment to form a polymer network. Alternatively, these substances can be introduced as the chromophores in the polymer matrix. Some examples of the polymer matrix are polyimide; polyethylene, cellulose acetate; polystyrene; polycarbonate; polyester; polyacrylonitrile; polyacetal, polyacrylamide; polybutadiene; polyvinylalcohol; polymethyl-methacrylate; polyvinylcinnamate In both cases, the thermal, optical, electrical and mechanical properties can be improved. Usually the concentration of the substances in the polymer matrix does not exceed 5–15 wt/wt % so that the final thickness cannot be too thin however. The additives, which promote good adhesion, suitable viscosity and low curing temperature, can also be introduced.

Various methods can be used to put the PAM layer to the substrate, including spin-coating, dipping, spraying, brushing, printing, Langmuir-Blodgett technique and thermal evaporation in vacuum.

The following examples demonstrate the device structures, fabrications and applications of the photo-induced polarizers using the PAM materials. The PAM layers, obtained in the following examples, can be deposited on rigid or flexible substrates.

EXAMPLE 1

A thin film of the following azodye (1)

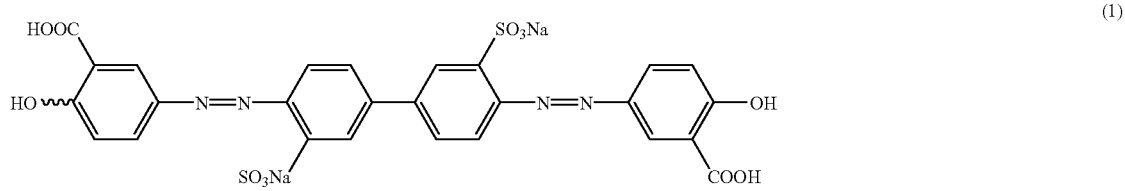

(1)

is prepared by the method of vacuum sublimation at pressure of about $2 \cdot 10^{-5}$ mm Mercury. The deposition temperature onto two glass plates is 20° C. The melting temperature of the azodye is 146° C. The deposition rate is 0.93 nm/sec and the total deposition time is 4.5 minutes. The final thickness of the azodye layer is 0.25 microns. During the deposition process, one of the glass plates is in-situ exposed to a linearly polarized light. The light is generated by a 250-Watt Mercury lamp with peak wavelength at 546 nm and the power density is 22.3 mW/cm$^2$. The same polarized light exposes the second glass plate after the azodye layer has been formed. It is found that the photo-induced optical retardation of the azodye, which is measured at wavelength 632.8 nm, is equal to $\lambda/12$. This is significant for many display applications. The energy densities for the first and second glass plates are about 4.1 J/cm$^2$ and 12.7 J/cm$^2$ respectively.

EXAMPLE 2

Another useful azodye (2) is shown below.

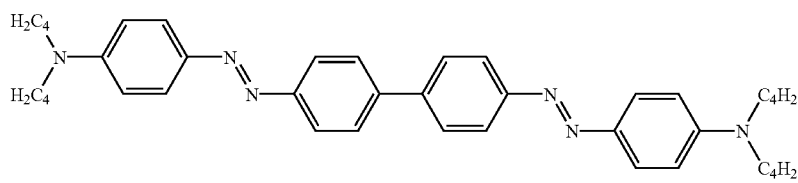

(2)

Figure 2:
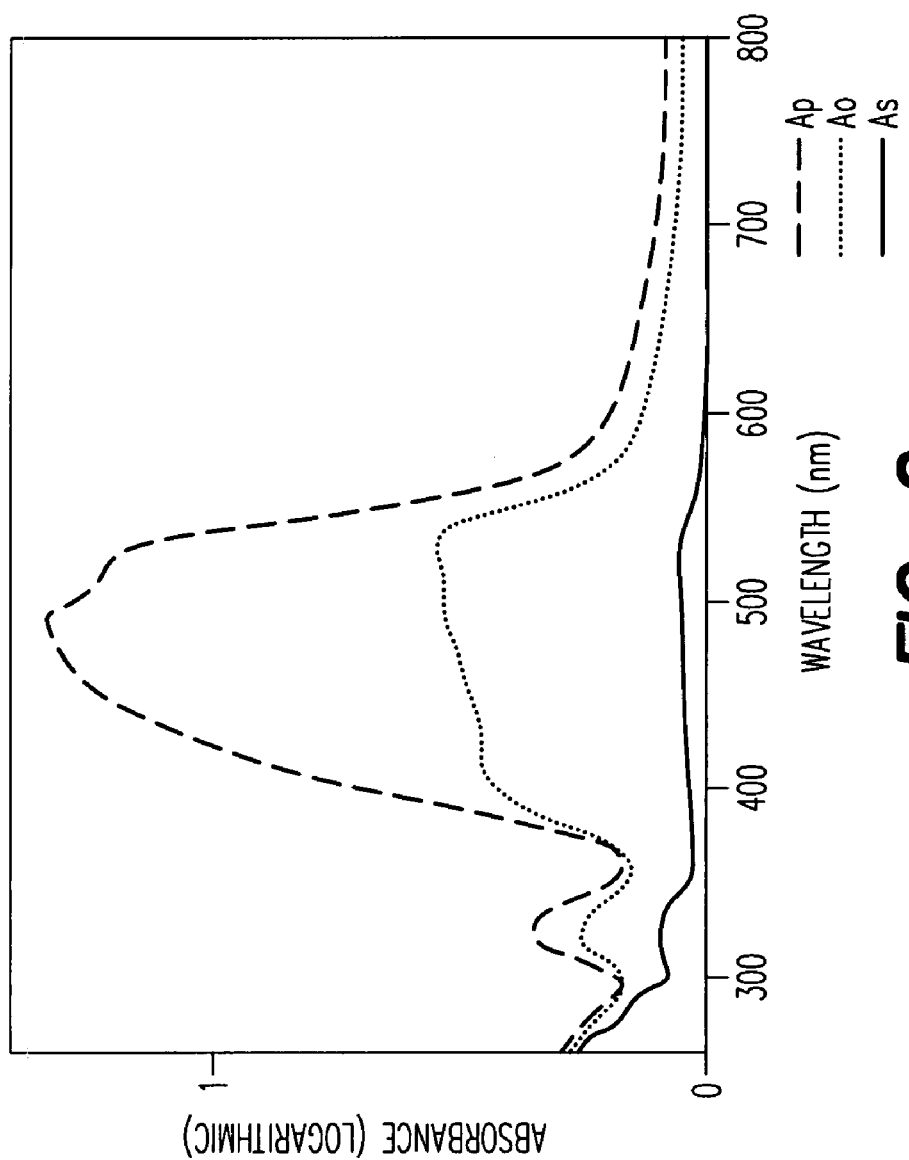
FIG. 2 shows the absorption spectra of the exposed azodye film, $A_0$ represents the absorbance before the illumination, and p and s are the suffixes of p- and s-waves.

To prepare the PAM layer, 1–10 wt % solution of the azodye in chlorobenzene is spin-coated on a glass substrate at room temperature. This solid dye film is then irradiated at normal incidence by a polarized UV light. The light source is a 1000 W Oriel Xenon arc lamp. The UV sheet polarizer is purchased from Oriel Instruments. The intensity of polarized UV light at 365 nm is about 6 mW/cm$^2$. The energy density is about 10.8 J/cm$^2$. In FIG. 2, the absorption spectra of azodye (2) are shown, and the order parameter calculated in this case is 0.86. FIG. 2 shows the absorption spectra prior to exposure to polarized light (Ao) and of the p (Ap) and s (As) waves respectively after exposure to polarized light. The high absorption of the p wave in contrast to the s wave shows that the azodye layer is effectively polarized.

EXAMPLE 3

Figure 3A:
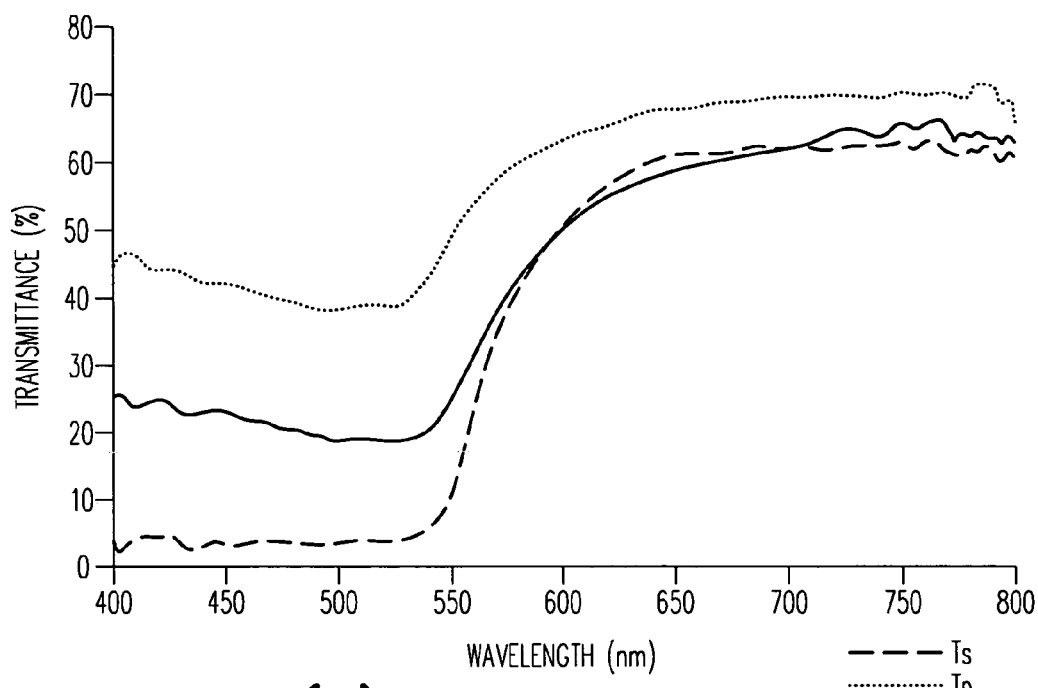
FIG. 3 shows the transmission spectra of the exposed azodye film before (a) and after (b) treatment with iodine.
Figure 3B:
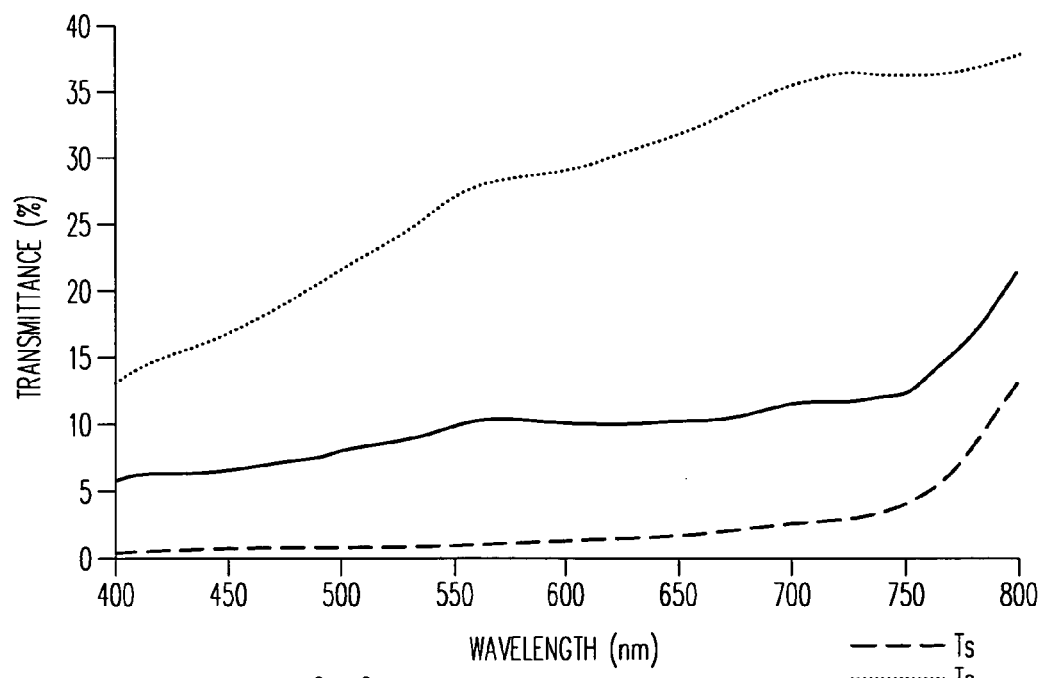

The azodye layer can have a top coating of iodine or alcohol molecules. Such a coating may change the spectra of the dye making it more useful for applications in the visible light range. FIG. 3 shows the transmission spectra of the azodye (2) before (a) and after (b) the treatment with iodine. The exposed PAM layer is prepared in accordance with Example 2, and then the iodine molecules are evaporated at room temperature and atmospheric pressure. The film thickness of iodine molecules has been measured in a control experiment. In the present example, a thin film of about 20nm is deposited on top of the exposed PAM layer. The coated layer is stable against the ambient light and low power laboratory lasers.

EXAMPLE 4

Figure 4:
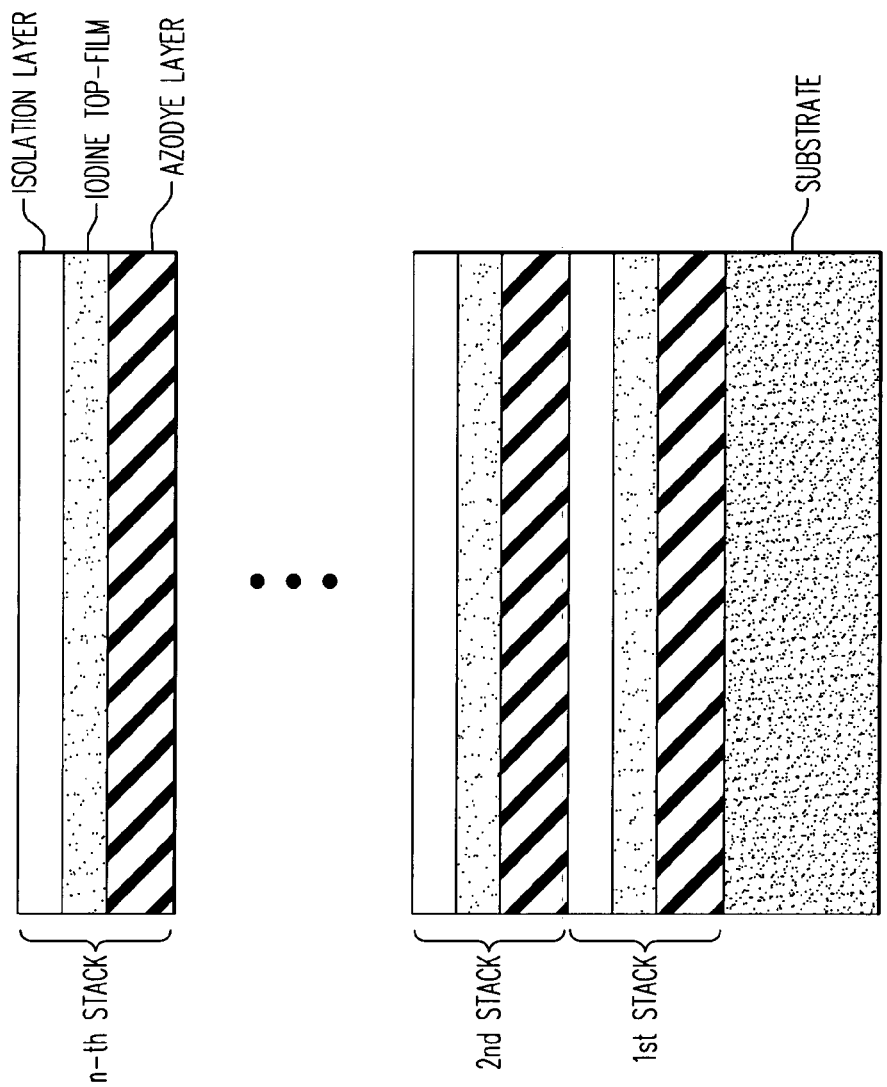
FIG. 4 shows an embodiment of the invention in the form of a multi-layer structure.

To optimise the extinction ratio and optical transmittance, a multi-layers structure may be formed as shown in FIG. 4. The exposed PAM layer, which has a top coating of iodine, is prepared in accordance with Example 3. However, the thickness of the PAM layer and the top coating are reduced accordingly. To isolate this coated layer from each other, a thin layer about 10 nm of polymer such as polyvinyl-alcohol is thermally evaporated onto the iodine layer. This embodiment of the invention improves both the optical and mechanical properties of the resultant polarizer.

EXAMPLE 5

The preferred orientation of the dye molecules and consequently the direction of the polarization axis can be independently varied in different surface regions. The sizes of these regions may vary from several microns to tenths of centimeters. FIG. 5 shows an embodiment of the invention in the form of a multi-axis photo-induced polarizer, which has different local polarization axes in different regions. A dichroic layer 2 is formed on a substrate 2 and is divided into a plurality of regions 3. Each region 3 is exposed selectively by polarized light in order to induce the polarization shown by the polarization axes 4. The different regions may be formed by masking the remainder of the azodye layer and subjecting a selected region to a particular form of polarized light. Each region may thus be polarized in turn. FIG. 6 provides another possible realization of the multi-axes polarizers. FIG. 6 shows the result of illuminating a plate bearing a dichroic layer with axially polarized light and allowing the plate to rotate. This creates the polarization distribution shown in FIG. 6. Because the dichroic layer will be polarized in a direction perpendicular to the axis of the polarizing light, the rotational movement of the plate results in circumferential polarization. The photographs in crossed polarizers illustrate the corresponding distribution of the intensity variations.

EXAMPLE 6

Figure 7A:
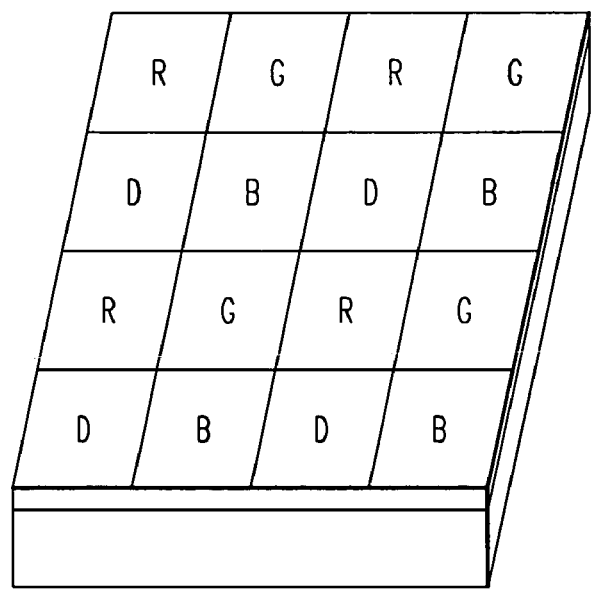
FIG. 7 shows embodiments of the invention with multi-colour structures.
Figure 7B:
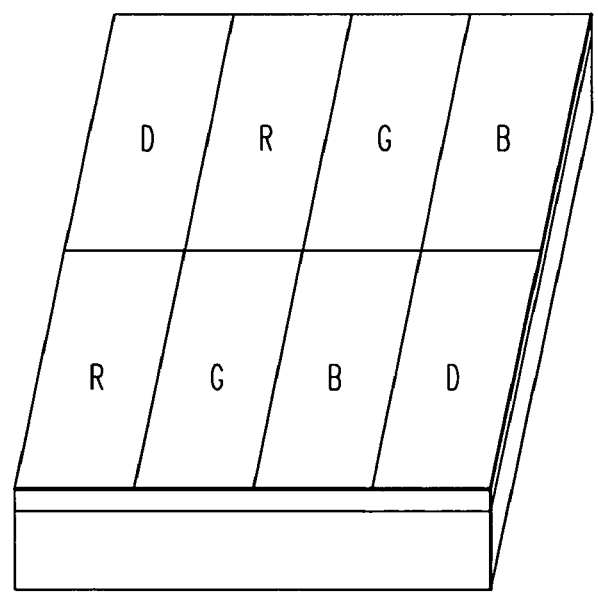

The absorption bands of the dye molecules and consequently the colour can be independently varied in different surface regions. The sizes of these regions vary from several microns to tenths of centimeters. FIG. 7(*a*) and (*b*) show the multi-colour photo-induced polarizers, which have different local absorption spectra in different regions. In the figures the letters R,G,B and D stand for red, green, blue and dark respectively as examples. This can be achieved by applying different coatings to different regions in order to provide different spectral responses in the various regions.

EXAMPLE 7

Figure 8:
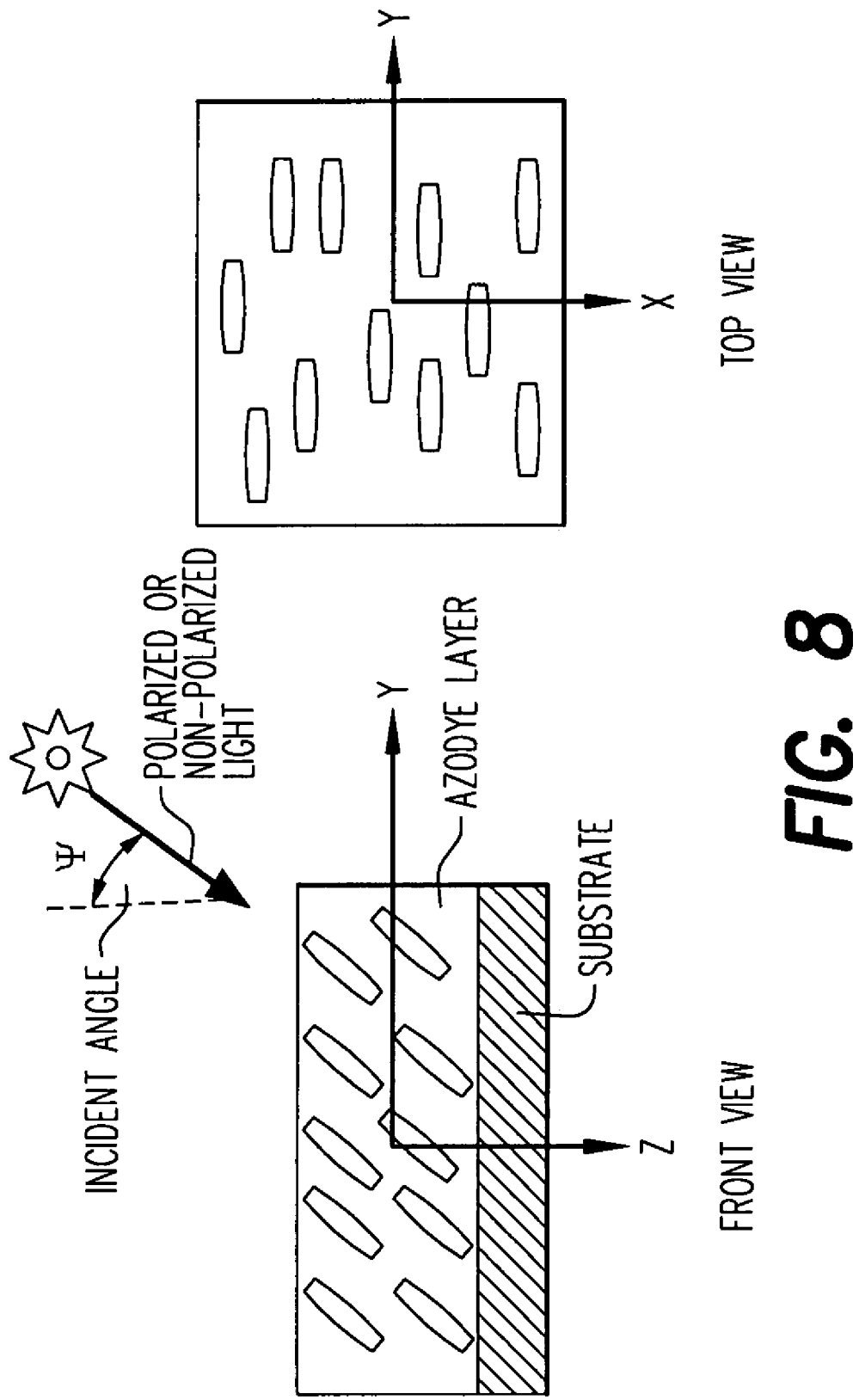
FIG. 8 is an illustration of induced optical anisotropy when an azodye layer is illuminated obliquely by a polarized or non-polarized but directed light.

The direction of polarization axis can be induced using the obliquely incident polarized or non-polarized light (FIG. 8). The optical anisotropy and dichroism depend on the exposure energy, incident angle and process temperature. This makes possible the uniform polarization direction on the curved surface (e.g. lens) or micro-objects with a surface relief profile (e.g. diffraction gratings).

It will thus be seen that, at least in its preferred forms, the present invention provides novel device structures and fabrication technologies for photo-induced polarizing materials. When the dichroic molecules are optically pumped by a polarized light beam, the probability of their transformation is proportional to the square of the cosine θ, the angle between the transition dipole moments of the molecules and the direction of the polarized light. In other words, the molecules that have their transition dipole moments parallel to the direction of the polarized light will probably undergo the transformation. To minimize the dipolar absorption at the low power density regime, cis-trans isomerization and/or thermal diffusion in a potential field of the actinic light occurs and both lead to a non-uniform distribution of the molecules. In certain dichroic materials, these give rise to long-lasting optical anisotropy and dichroism that are able to polarize the light wave selectively. In a polymer matrix, this induced optical anisotropy and dichroism can be even higher and kept for a long time. This can also be accomplished if the dichroic molecules can be polymerized by thermal or photo treatment. Therefore, a permanent polarizer can be fabricated by a non-contact technique that basically requires an actinic radiation source. In preferred forms of the invention, multi-layers, -axes and -colour polarizers using these dichroic materials are also possible and which may have applications, for example, for the wide viewing-angle LCD applications.

The invention claimed is:

1. A method of forming a polarizing material comprising the steps of:
    (a) forming a layer of a photochemically stable dichroic absorber on a substrate,
    (b) exposing said layer to activating light illumination to provide an ordered structure with a distinguished absorption axis, and
    (c) polymerizing said layer.

2. A method as claimed in claim 1 wherein different regions are polarized by activating radiation with different polarization axes so as to produce regions of said polarizing material with differing axes of polarization.

3. A method as claimed in claim 2 wherein regions of said layer are exposed independently by the use of masks to isolate selected regions for exposure.

4. A method as claimed in claim 2 wherein a birefringence mask is used to create activating radiation with a selected spatial distribution of polarization vectors.

5. A method as claimed in claim 1 comprising forming a plurality of said layers on said substrate with said layers being separated by isolation layers.

6. A method as claimed in claim 1 wherein said activating radiation is polarized or non-polarized, but directed.

7. A method as claimed in claim 1 wherein said activating radiation is a continuous waveform or is pulsed.

8. A method as claimed in claim 1 wherein the polarization of the dichroic layer is controlled by varying parameters selected from the group consisting of the incident angle of the activating radiation, the exposure energy density and the process temperature.

9. A method as claimed in claim 1 wherein the dichroic layer is formed on the substrate by a method selected from the group consisting of spin-coating, dipping, spraying, brushing, printing, Langmuir-Blodgett technique or thermal evaporation.

10. A method of forming a polarizing material comprising the steps of:
    (a) forming a layer of a photochemically stable dichroic absorber on a substrate,
    (b) exposing said layer to activating light illumination to provide an ordered structure with a distinguished absorption axis, and
    (c) providing said layer with a coating to change its spectral response.

11. A method as claimed in claim 10 further comprising polymerising said layer.

12. A method as claimed in claim 10 wherein different regions of said layer are formed with different coatings to produce a multi-color polarizing material.

13. A polarizing material comprising a layer of photochemically stable dichroic molecules exhibiting photo-induced anisotropy upon the absorption of light, wherein the polarizing material is provided with a coating of a material selected to alter the spectral response of said material.

14. A polarizing material as claimed in claim 13 wherein the selected material is iodine.

* * * * *